(12) United States Patent
Chin et al.

(10) Patent No.: US 6,464,085 B1
(45) Date of Patent: Oct. 15, 2002

(54) CD-ROM RACK

(75) Inventors: Ming-Hwa Chin; Chao-Kun Chan, both of Taoyuan Hsien (TW)

(73) Assignee: Enlight Corporation, Taoyuan Hsien (TW)

( * ) Notice: Subject to any disclaimer, the term of this patent is extended or adjusted under 35 U.S.C. 154(b) by 0 days.

(21) Appl. No.: 09/988,532

(22) Filed: Nov. 20, 2001

(51) Int. Cl.[7] .................................................. A47F 7/00
(52) U.S. Cl. ......................................................... 211/26
(58) Field of Search ........................ 211/26, 162, 44.01; 361/683, 685

(56) References Cited

U.S. PATENT DOCUMENTS

| | | | | | |
|---|---|---|---|---|---|
| 5,515,979 | A | * | 5/1996 | Salvail | 206/308.1 |
| 5,599,080 | A | * | 2/1997 | Ho | 312/334.14 |
| 6,075,694 | A | * | 6/2000 | Mills et al. | 312/223.2 |
| 6,108,198 | A | * | 8/2000 | Lin | 312/223.1 |
| 6,373,695 | B1 | * | 4/2002 | Cheng | 312/223.1 |
| 6,378,966 | B1 | * | 4/2002 | Baker et al. | 211/26 |
| 6,388,875 | B1 | * | 5/2002 | Chen | 312/223.1 |
| 6,396,686 | B1 | * | 5/2002 | Liu et al. | 248/27.3 |
| 6,398,041 | B1 | * | 6/2002 | Abbott | 211/26 |

* cited by examiner

Primary Examiner—Alvin Chin-Shue
Assistant Examiner—Sarah Purol
(74) Attorney, Agent, or Firm—Troxell Law Office PLLC

(57) ABSTRACT

A CD-ROM rack includes a rack body adapted to support computer readable disk drivers/players on the inside at different elevations, the rack body having transverse sliding tracks at two opposite side panels thereof, a plurality of retaining spring plates respectively riveted to the side panels of the rack body and adapted for locking loaded computer readable disk drivers/players, and a plurality of elongated holding down plates respectively inserted into the transverse sliding tracks to hold down the retaining spring plates in the locking position.

1 Claim, 7 Drawing Sheets

CD-ROM RACK

BACKGROUND OF THE INVENTION

1. Field of the Invention

The present invention relates a CD-ROM rack adapted for holding a number of computer readable disk drivers/players at different elevations and, more particularly, to such a CD-ROM rack in which elongated holding down plates are inserted into respective transverse sliding tracks to control retaining spring plates, causing the retaining spring plates to lock/unlock loaded computer readable disk drivers/players.

2. Description of the Related Art

Various CD-ROM racks have been disclosed for use in computers to hold modularized computer readable disk drivers/players (hard disk driver, floppy disk driver, CD-ROM player, DVD player, etc.). Conventional CD-ROM racks commonly use tie screws to fix loaded computer readable disk drivers/players in position. According to this installation method, it is convenient to remove one computer readable disk driver/player from the rack for repair. There are also known CD-ROM racks having locking means at one single side for locking loaded computer readable disk drivers/players. These designs are still not satisfactory in function. During delivery of the computers, the computer readable disk drivers/players tend to be forced out of position.

SUMMARY OF THE INVENTION

The present invention has been accomplished to provide a CD-ROM rack, which eliminates the aforesaid drawbacks. It is the main object of the present invention to provide a CD-ROM rack, which positively secures the loaded computer readable disk drivers/players in position. It is another object of the present invention to provide a CD-ROM rack, which enables the loaded computer readable disk drivers/players to be easily unlocked and removed from the rack body for repair. To achieve these and other objects of the present invention, the CD-ROM rack comprises a rack body adapted for supporting computer readable disk drivers/players on the inside at different elevations, the rack body having transverse sliding tracks at two opposite side panels thereof, a plurality of retaining spring plates respectively riveted to the side panels of the rack body and adapted for locking loaded computer readable disk drivers/players, and a plurality of elongated holding down plates respectively inserted into the transverse sliding tracks to hold down the retaining spring plates. in the locking position.

DETAILED DESCRIPTION OF THE PREFERRED EMBODIMENT

Figure 1:
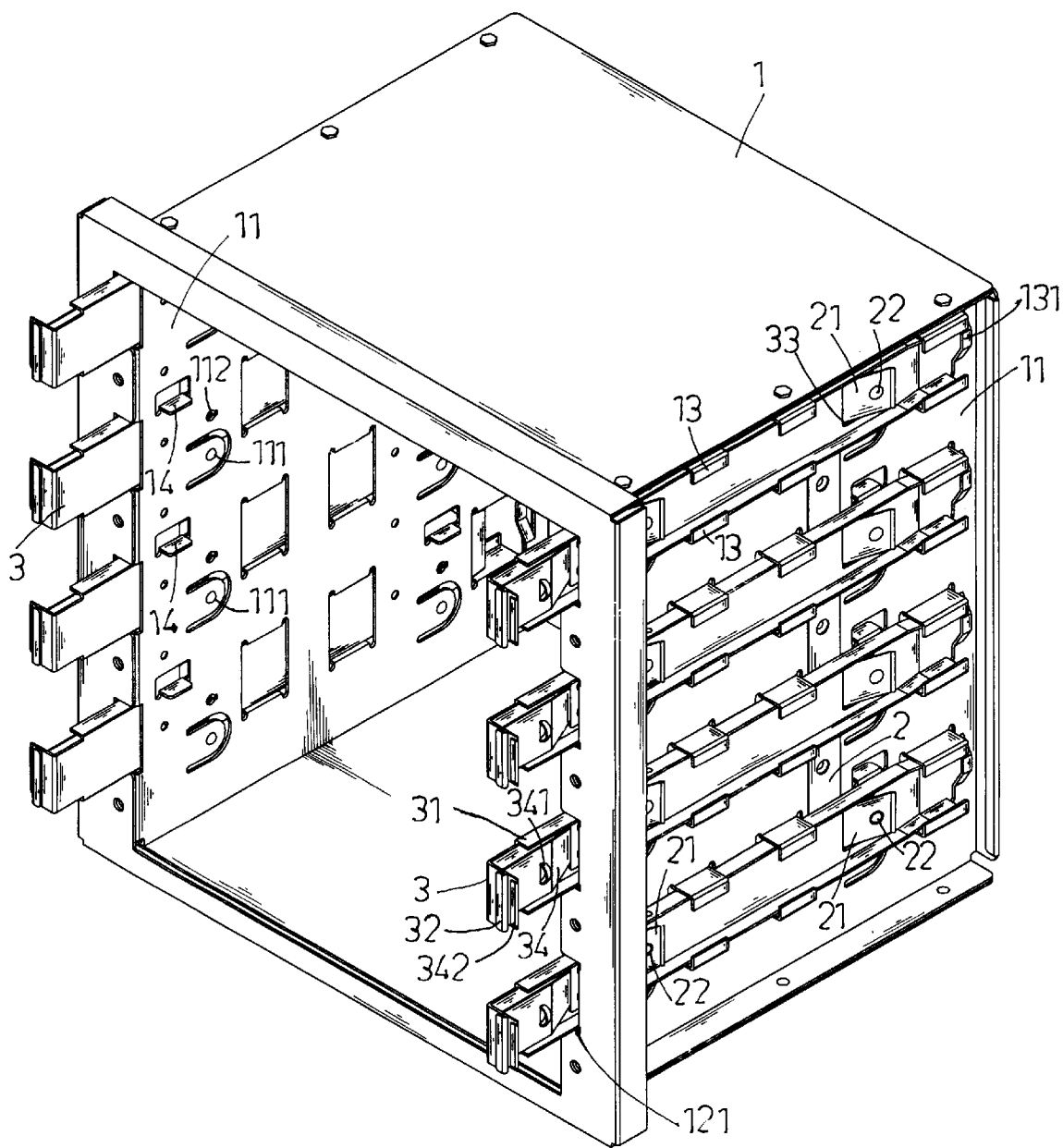
FIG. 1 is a perspective view of a CD-ROM rack constructed according to the present invention.
Figure 2:
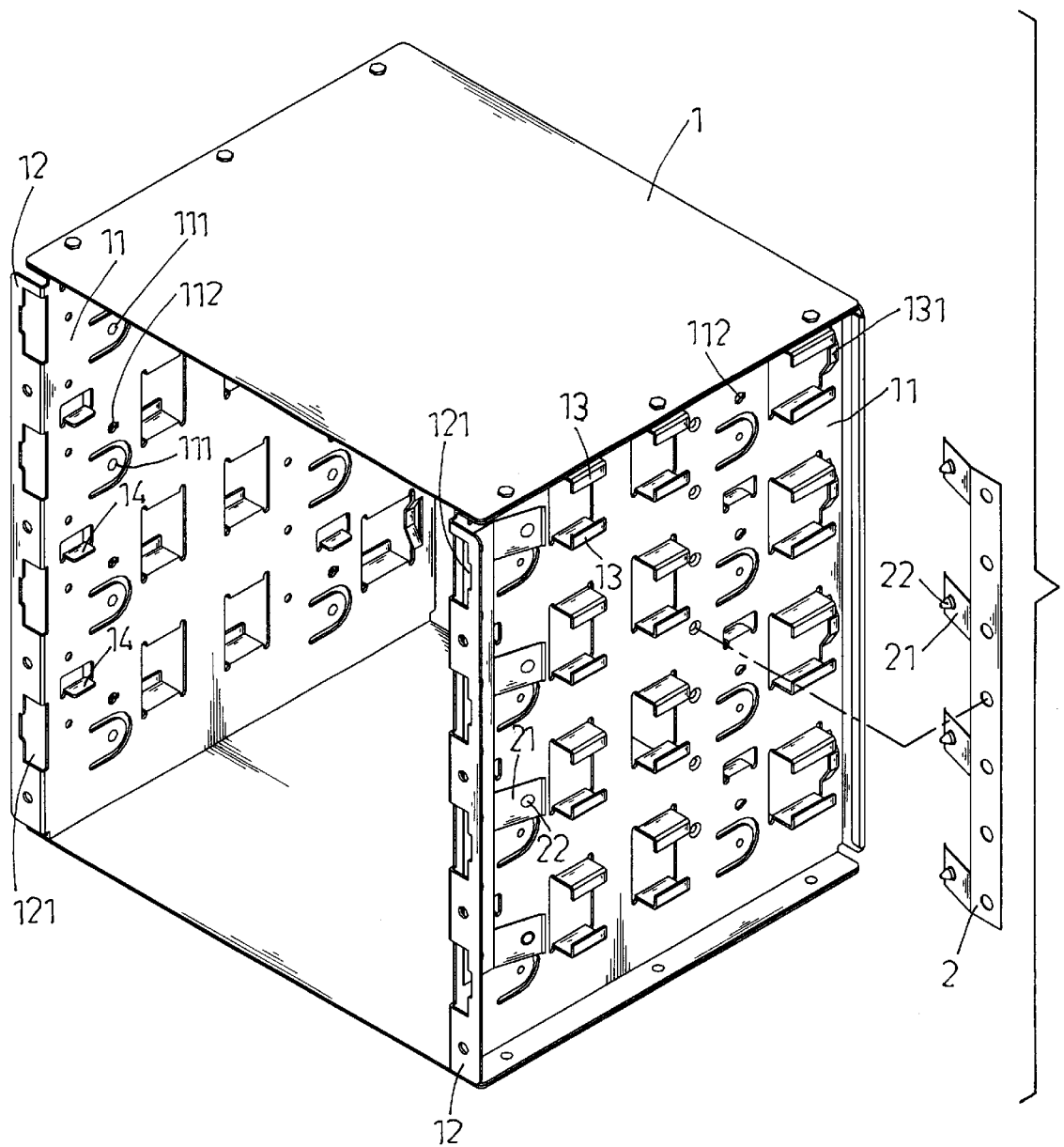
FIG. 2 is an exploded view of a part of the present invention, showing the retaining spring plate separated from the rack body.
Figure 3:
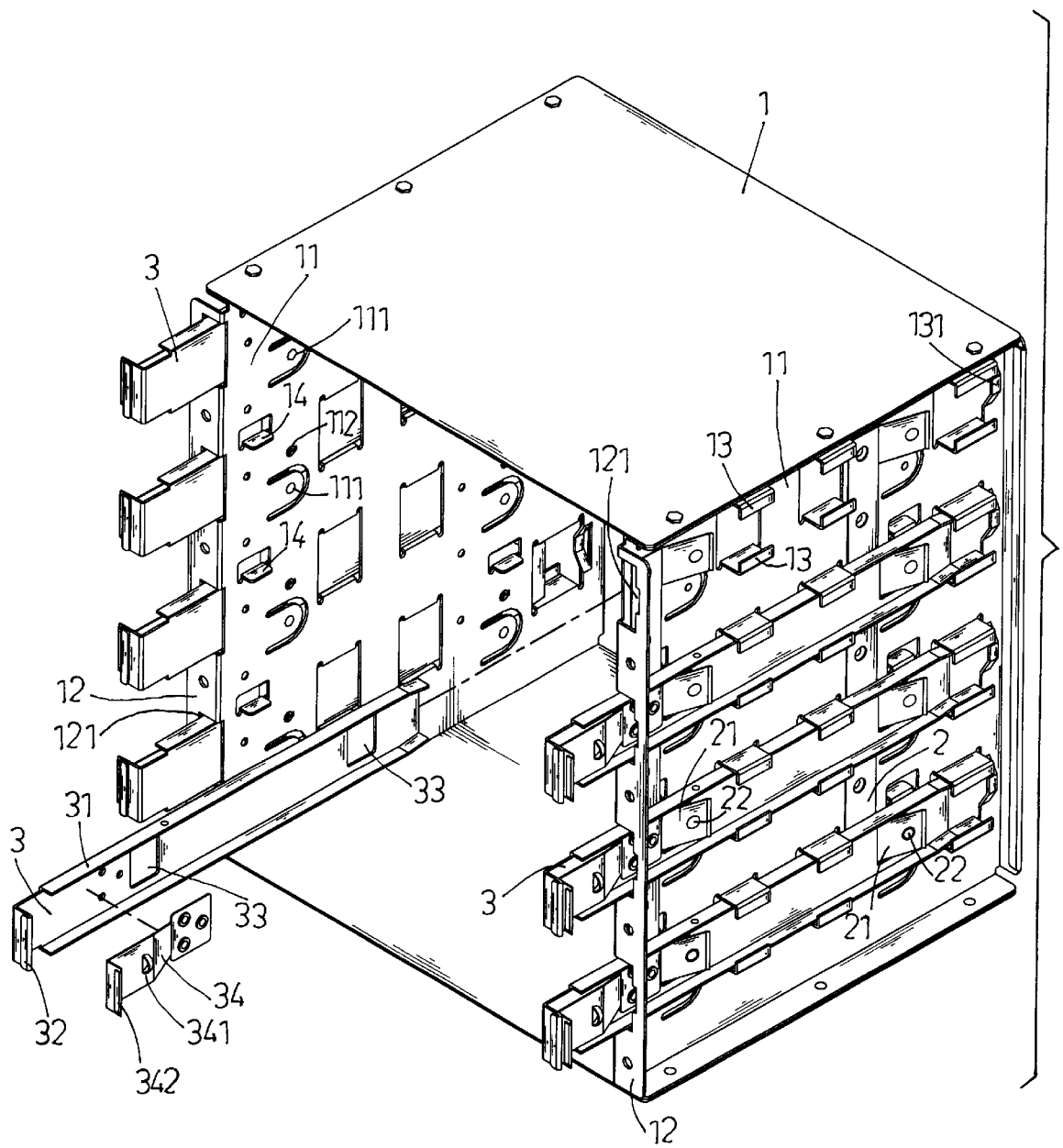
FIG. 3 is an exploded of a part of the present invention, showing the locking spring plate separated from the elongated holding down plate.
Figure 4:
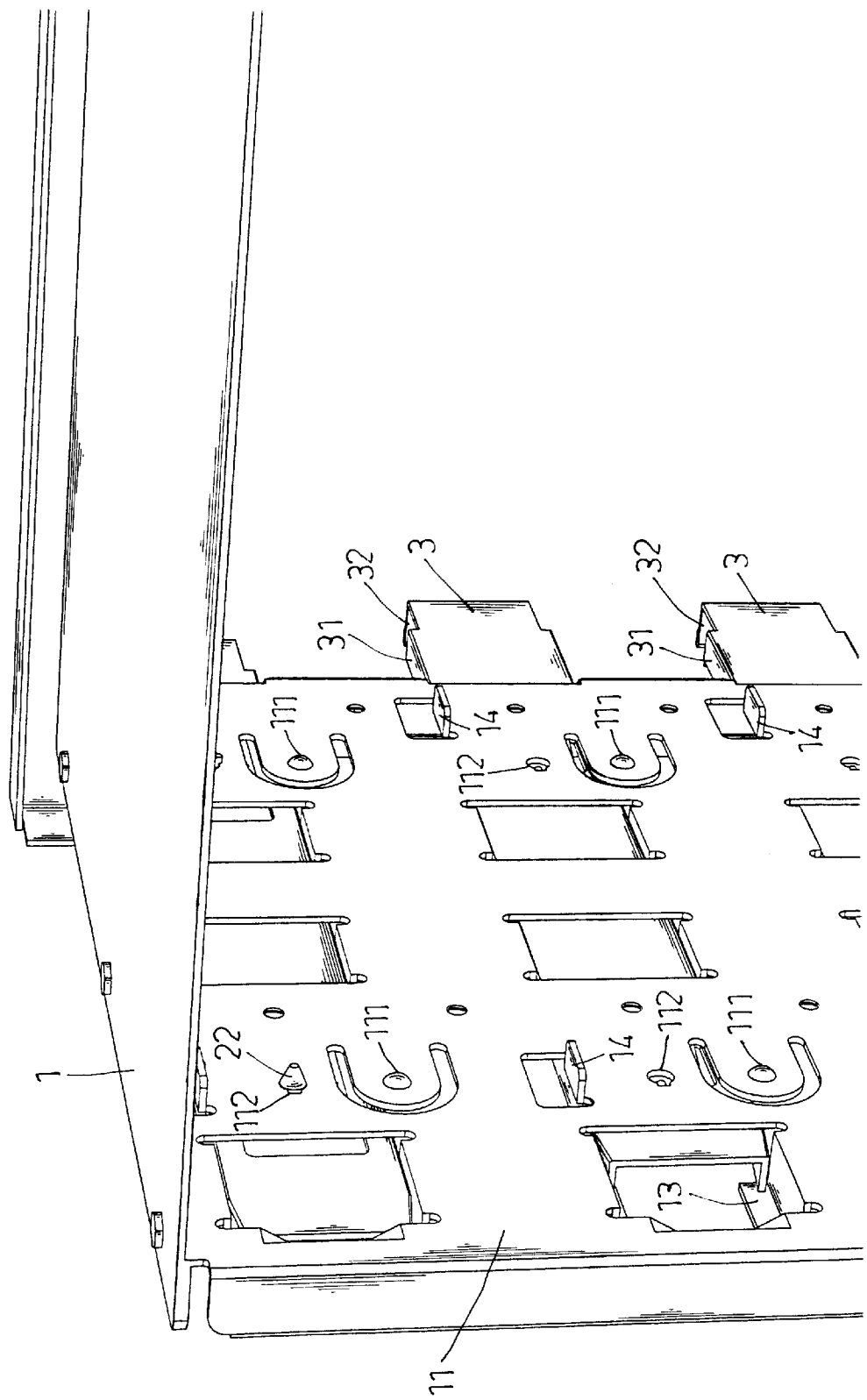
FIG. 4 is a perspective view in an enlarged scale of a part of the rack body for the CD-ROM rack according to the present invention.

Referring to FIGS. from 1 through 5, a CD-ROM rack in accordance with the present invention is generally comprised of a rack body 1, two pairs of retaining spring plates 2, and a plurality of elongated holding down plates 3. The rack body 1 is adapted for holding a plurality of computer readable disk drivers/players 4 at different elevations, comprising two vertical side panels 11 arranged in parallel. The side panels 11 each comprise transverse rows of bearing lugs 14 horizontally disposed on the inside and adapted for supporting computer readable disk drivers/players 4 at different elevations, a plurality of transverse sliding tracks 13 disposed on the outside at different elevations corresponding to the transverse rows of bearing lugs 14, a plurality of raised portions 111 and through holes 112 respectively disposed in the transverse sliding tracks 13, a plurality of protruded stop portions 131 respectively disposed in the rear ends of the transverse sliding tracks 13, a front flange 12 outwardly extended from the front side thereof at right angles, and a plurality of front insertion holes 121 disposed in the front flange 12 at different elevations corresponding to the transverse sliding tracks 13. The retaining spring plates 2 are symmetrically vertically riveted to the two side panels 11 of the rack body 1 near the front and rear sides, each comprising a plurality of horizontal spring strips 21 disposed at different elevations. The horizontal spring strips 21 each have a locating pin 22 respectively disposed corresponding to the through holes 112 of the side panels 11 (see FIG. 4). The elongated holding down plates 3 are respectively inserted into the transverse sliding tracks 13 of the side panels 11 of the rack body 1, each comprising two longitudinal rails 31 respectively extended along the top and bottom sides thereof and adapted for guiding the respective elongated holding down plate 3 into the corresponding transverse sliding track 13, a front hook 32 extended from the front end thereof, two openings 33 corresponding to the horizontal spring strips 21 of the retaining spring plates 2, and a locking spring plate 34 riveted to a front part thereof between the front hook 32 and the front-sided opening 33. The locking spring plate 34 comprises a protruded retaining portion 341 and a finger spring 342.

Figure 5:
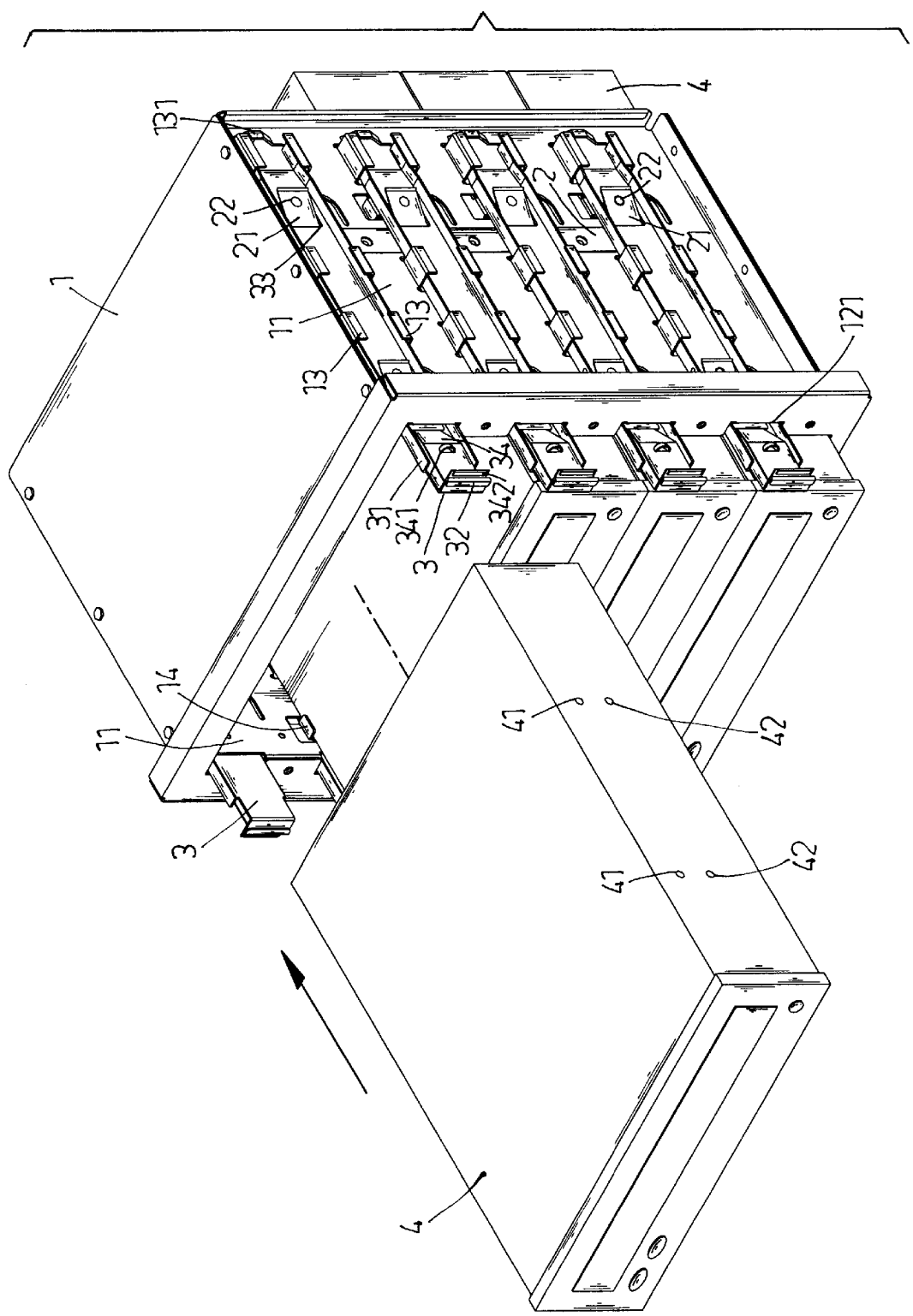
FIG. 5 is a schematic drawing showing the installation of computer readable disk drivers/players in the CD-ROM rack according to the present invention.
Figure 7:
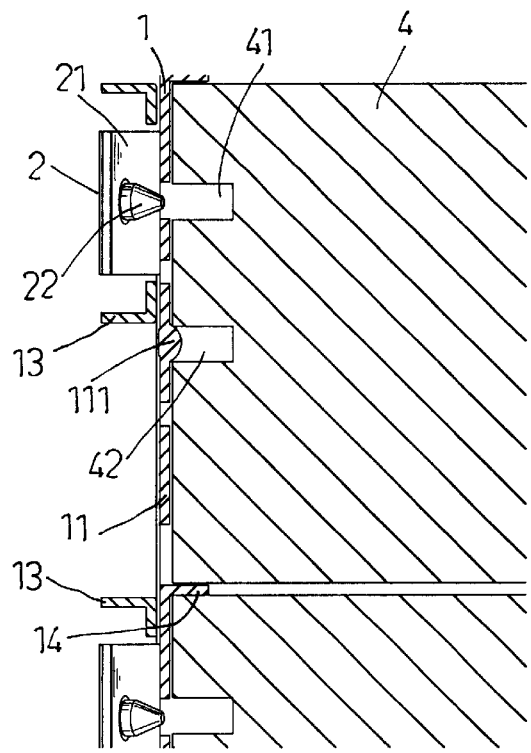
FIG. 7 is a sectional view in an enlarged scale of a part of the present invention showing the locating pins of the retaining spring plates respectively aimed at the first locating holes of the loaded computer readable disk drivers/players.

Referring to FIG. 7 and FIG. 5 again, each computer readable disk driver/player 4 has a plurality of first locating holes 41 and second locating holes 42 disposed on the two opposite lateral sidewalls thereof at different elevations. When one computer readable disk driver/player 4 inserted into the rack body 1 and supported on one transverse row of bearing lugs 14 of each side panel 11 of the rack body 1, the second locating holes 42 of the computer readable disk driver/player 4 are respectively forced into engagement with the corresponding raised portions 111 of the side panels 11 of the rack body 1.

Figure 6:
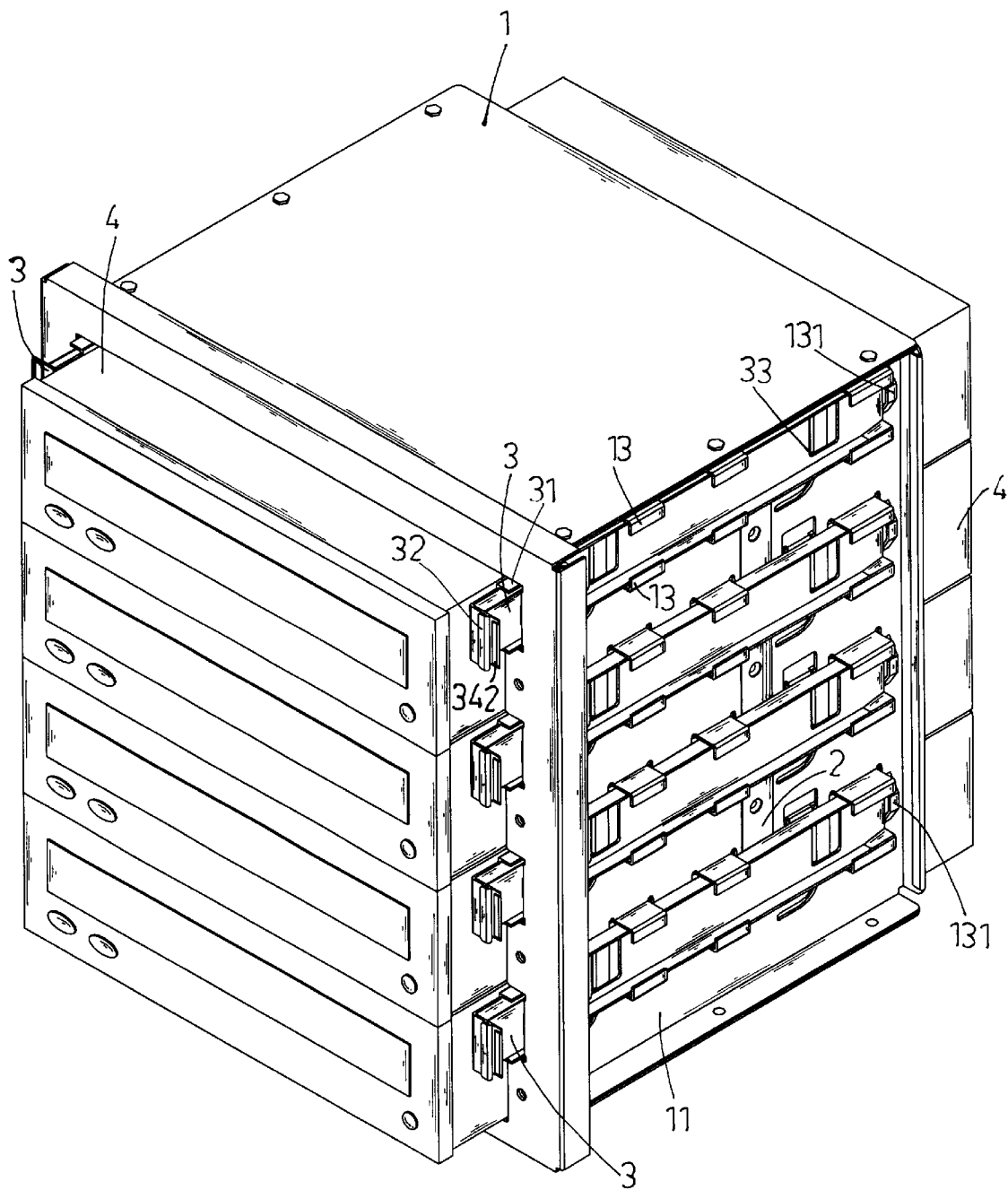
FIG. 6 is a perspective view showing computer readable disk drivers/players installed in the rack body of the CD-ROM rack according to the present invention.
Figure 8:
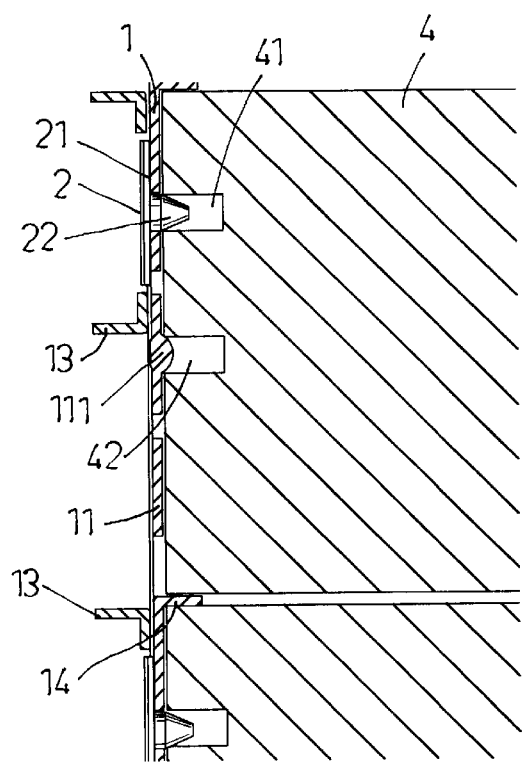
FIG. 8 is similar to FIG. 7 but showing the locating pins of the retaining spring plates respectively engaged into the first locating holes of the loaded computer readable disk drivers/players.

Referring to FIGS. 6 and 8, after insertion of the computer readable disk driver/player 4 in the rack body 1, two elongated holding down plates 3 are respectively inserted through the corresponding front insertion holes 121 of the front flanges 12 of the side panels 11 of the rack body I into the corresponding transverse sliding tracks 13 of the side panels 11 to lock the computer readable disk driver/player 4 and stopped at the respective protruded stop portions 131 of the side panels 11 of the rack body 1. After insertion of one elongated holding down plate 3 into one transverse sliding track 13 of one side panel 11 of the rack body 1, the protruded retaining portion 341 of the locking spring plate 34 is maintained engaged with the front flange 12 of the corresponding side panel 11 of the rack body 1, and the elongated holding down plate 3 forces the corresponding horizontal spring strips 21 of the two retaining spring plates 2 inwards, thereby causing the locating pins 22 of the horizontal spring strips 21 to be respectively inserted through the corresponding through holes 112 of the corresponding side panel 11 and engaged into the first locating holes 41 of the Computer readable disk driver/player 4. When removing the loaded computer readable disk driver/player 4 from the rack body 1, move the finger strip 342 of the locking spring plate 34 toward the elongated holding down plate 3 to disengage the protruded retaining portion 341 of the locking spring plate 34 from the front flange 12 of the corresponding side panel 11 of the rack body 1, and then pull the elongated holding down plate 3 outwards from the front insertion hole 121 of the front flange 12 of the corresponding side panel 11 of the rack body 1 to release the retaining spring plates 2 from the first locating holes 41 of the computer readable disk driver/player 4, for enabling the computer readable disk driver/player 4 to be pulled out of the rack body 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A CD-ROM rack comprising:

a rack body, said rack body comprising two vertical side panels arranged in parallel, said side panels each comprising a plurality of transverse rows of bearing lugs horizontally disposed on an inside wall thereof and adapted for supporting computer readable disk drivers/players inside said rack body at different elevations, a plurality of transverse sliding tracks disposed on an outside wall thereof at different elevations corresponding to said transverse rows of bearing lugs, a plurality of through holes respectively disposed in said transverse sliding tracks, a front flange outwardly extended from a front side thereof at right angles, and a plurality of front insertion holes disposed in said front flange at different elevations corresponding to said transverse sliding tracks;

a plurality of retaining spring plates symmetrically vertically riveted to the two side panels of said rack body and arranged in parallel, said retaining spring plates each comprising a plurality of horizontal spring strips disposed at different elevations, said horizontal spring strips each having a locating pin respectively disposed corresponding to the through holes of the side panels of said rack body and adapted for securing a respective computer readable disk driver/player in said rack body; and a plurality of elongated holding down plates respectively inserted into the transverse sliding tracks of the side panels of said rack body to force the horizontal spring strips of said retaining spring plates into engagement with respective computer readable disk drivers/players inserted in said rack body, said elongated holding down plates each comprising two longitudinal rails respectively extended along top and bottom sides thereof and adapted for guiding the respective elongated holding down plates into the transverse sliding tracks of the side panels of said rack body, a front hook extended from a front end thereof and adapted for mounting, two openings corresponding to the horizontal spring strips of said retaining spring plates, and a locking spring plate riveted to a front part thereof between, said locking spring plate comprising a protruded retaining portion adapted for engaging the front flange of one side panel of said rack body, and a finger spring for operation by hand to disengage said protruded retaining portion from the front flange of the corresponding side panel of said rack body.

* * * * *